(12) United States Patent
Yamamoto (10) Patent No.: US 11,568,854 B2
(45) Date of Patent: Jan. 31, 2023

(54) COMMUNICATION SYSTEM, SERVER SYSTEM, AND CONTROL METHOD

(71) Applicant: CANON KABUSHIKI KAISHA, Tokyo (JP)

(72) Inventor: Hiroyuki Yamamoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 110 days.

(21) Appl. No.: 16/952,803

(22) Filed: Nov. 19, 2020

(65) Prior Publication Data

US 2021/0166677 A1 Jun. 3, 2021

(30) Foreign Application Priority Data

Nov. 28, 2019 (JP) .............................. JP2019-215824

(51) Int. Cl.
| | |
|---|---|
| *G10L 13/04* | (2013.01) |
| *H04N 1/04* | (2006.01) |
| *H04N 1/00* | (2006.01) |
| *G10L 15/26* | (2006.01) |

(52) U.S. Cl.
CPC .............. *G10L 13/04* (2013.01); *G10L 15/26* (2013.01); *H04N 1/00403* (2013.01); *H04N 1/0461* (2013.01)

(58) Field of Classification Search
CPC ................................. G10L 15/26; G10L 13/04
See application file for complete search history.

(56) References Cited

U.S. PATENT DOCUMENTS

2016/0014293 A1* 1/2016 Iwai .................... H04N 1/00949
   358/1.15
2020/0195803 A1* 6/2020 Kobayashi ......... H04N 1/00403

FOREIGN PATENT DOCUMENTS

JP 2017167753 A 9/2017

* cited by examiner

*Primary Examiner* — Ibrahim Siddo
(74) *Attorney, Agent, or Firm* — Canon U.S.A., Inc. IP Division (57) ABSTRACT

A communication system that includes a server system, a voice terminal and a document reading apparatus. The document reading apparatus includes a reading unit configured to execute reading of a document, wherein recognition processing for recognizing a character written in the document is executed based on image data generated by the reading. Furthermore, the voice terminal comprises a receiving unit configured to receive a predetermined instruction by user's voice, and the server system comprises a processing unit configured to execute output processing for outputting the character recognized by the recognition processing by voice by the voice terminal based on receiving the predetermined instruction by the voice terminal.

17 Claims, 8 Drawing Sheets

| IDENTIFICATION INFORMATION | TEXT INFORMATION |
|---|---|
| AAAA | NOTICE OF ATHLETIC FESTIVAL, DATE: OCTOBER 10, 2019 |
| BBBB | NOTICE OF RICE CAKE MAKING FESTIVAL, DATE: JANUARY 10, 2019 |
| CCCC | SPECIAL CLASS DURING SUMMER HOLIDAY |
|  |  |
|  |  |
|  |  |

COMMUNICATION SYSTEM, SERVER SYSTEM, AND CONTROL METHOD

BACKGROUND

Field

The present disclosure relates to a communication system, a server system, and a control method.

Description of the Related Art

Japanese Patent Application No. 2017-167753 discusses a technique for outputting a processing instruction and voice data by voice to a communication apparatus based on a user instruction issued by voice.

Conventional techniques do not consider that a user instructs, by voice, a document reading apparatus to read a document or a voice control terminal to read aloud characters written in the read document.

SUMMARY

The present disclosure is directed to a technique for enabling a user to instruct, by voice, a document reading apparatus to read a document and a voice control terminal to read aloud characters written in the read document. According to an aspect of the present disclosure, a communication system includes a server system, a voice terminal and a document reading apparatus. The document reading apparatus includes a reading unit configured to execute reading of a document, wherein recognition processing for recognizing a character written in the document is executed based on image data generated by the reading. Furthermore, the voice terminal comprises a receiving unit configured to receive a predetermined instruction by user's voice, and the server system comprises a processing unit configured to execute output processing, for outputting the character recognized by the recognition processing by voice by the voice terminal based on receiving the predetermined instruction by the voice terminal.

Further features will become apparent from the following description of exemplary embodiments with reference to the attached drawings.

DESCRIPTION OF THE EMBODIMENTS

Exemplary embodiments will be described in detail below with reference to the attached drawings. The exemplary embodiments which will be described below are merely illustrative and do not restrict the present disclosure to the claims. All of combinations of the features described in the exemplary embodiments are not always essential to the means for solution according to the present disclosure.

A document reading apparatus and a voice terminal according to a first exemplary embodiment will be described. A multifunction printer (hereinbelow, referred to as an MFP) which can provide a copy service, a facsimile (FAX) service, and a print service is described as example of the document reading apparatus according to the present exemplary embodiment. However, the present exemplary embodiment is not limited to the MFP. The present exemplary embodiment can be applied to various apparatuses as long as the apparatus can read a document as the document reading apparatus and communicate with the voice terminal. For example, the present exemplary embodiment can be applied to a printer such as an inkjet printer, a full-color laser beam printer, and a monochrome printer. In addition, the present exemplary embodiment can be applied to a single function scanner having a single function. According to the present exemplary embodiment, reading of a document is performed by an optical scanner, but is not limited to this form. For example, a document may be read by capturing an image of the document by a camera and the like. Therefore, the present exemplary embodiment can be applied to a device, such as a smartphone, a mobile phone, a personal computer (PC), a tablet terminal, a personal digital assistant (PDA), and a digital camera, as the document reading apparatus. Further, a smart speaker is described as an example of the voice terminal according to the present exemplary embodiment. A smart speaker is an apparatus which instructs a device existing in the same network to perform processing according to a voice uttered by a user and notifies a user of information obtained via the network in response to a voice uttered by the user. According to the present exemplary embodiment, an example of a function will be described which the document reading apparatus, the voice terminal, a voice relay server, and a web application server are associated with each other to perform character recognition processing or text recognition processing on a document image read by the document reading apparatus based on a voice instruction to the voice terminal and to output extracted information from the voice terminal by voice.

Figure 1:
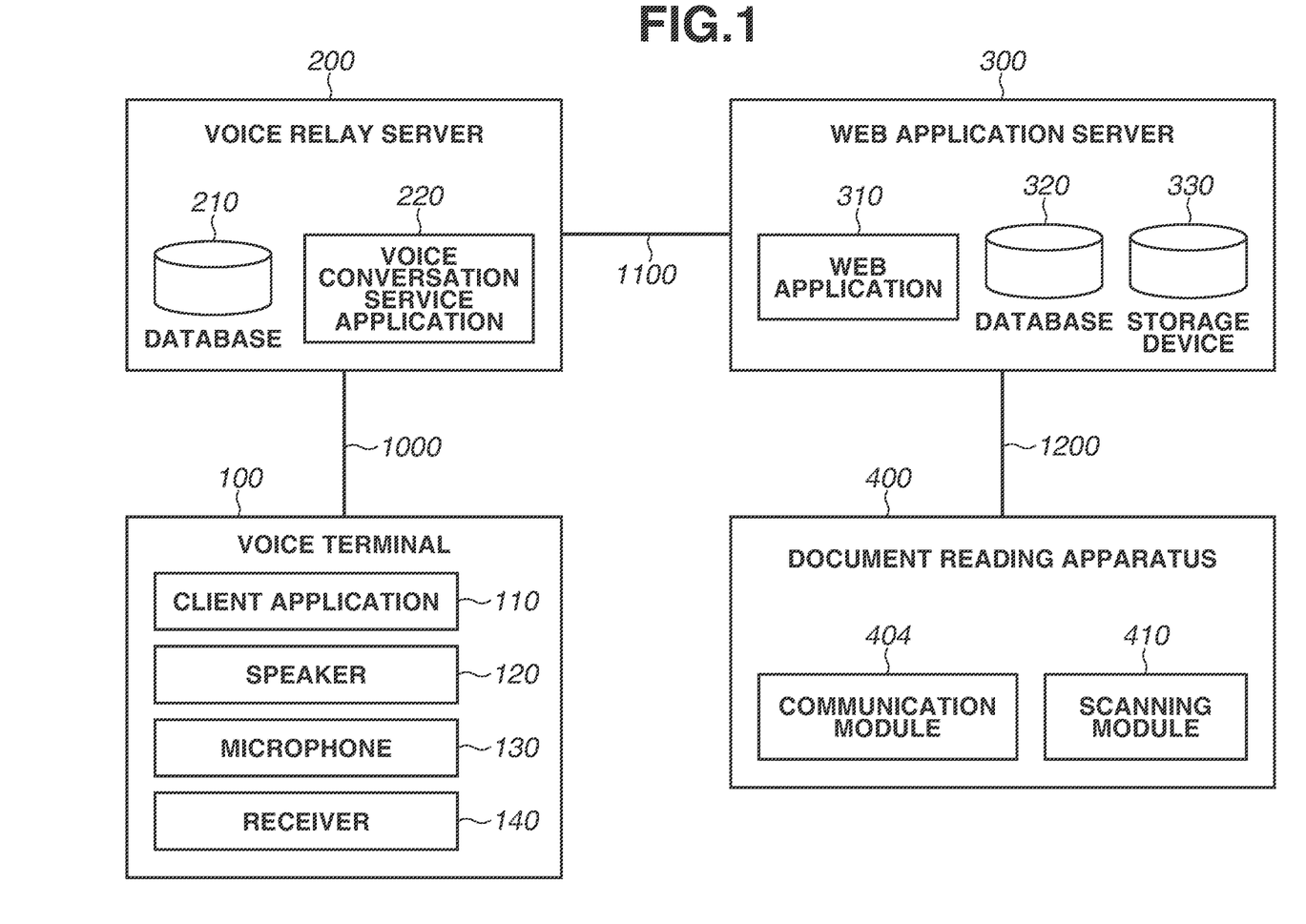
FIG. 1 illustrates an example of a configuration of a network system.

FIG. 1 illustrates an example of a configuration of a client server type network system 1 (a voice control system 1) according to the present exemplary embodiment. The network system 1 includes a voice terminal 100, a voice relay server 200, a web application server 300, and a document reading apparatus 400. In the network system 1, the voice terminal 100 and the voice relay server 200 can be connected to each other via a network 1000, and the voice relay server 200 and the web application server 300 can be connected to each other via a network 1100.

The networks 1000 and 1100 may be any of, for example, an Internet, a local area network (LAN), a wide area network (WAN), a telephone line, a dedicated digital line, asynchronous transfer mode (ATM) switching network, a frame relay line, a cable television line, and a wireless line for data broadcast. Further, the networks 1000 and 1100 may be a communication network implemented by combinations of the above-described networks as long as data can be transmitted and received via the network. Furthermore, the networks 1000 and 1100 may be different types of networks or may use the same type of network.

A client application 110 included in the voice terminal 100 transmits various pieces of data to a voice conversation service application 220 in the voice relay server 200 via the network 1000. In a case of the present exemplary embodiment, the client application 110 transmits voice data received by a microphone 130 and notification information from the document reading apparatus 400 received via a receiver 140 to the voice conversation service application 220. The voice terminal 100 outputs voice data received from the voice conversation service application 220 via a speaker 120.

A database 210 included in the voice relay server 200 stores dictionary data for recognizing and converting voice data into language data and dictionary data converting language data into voice data. The voice conversation service application 220 recognizes voice data transmitted from the client application 110 in the voice terminal 100 using the dictionary data stored in the database 210. The voice conversation service application 220 converts the recognized voice data into language data and transmits the language data to a web application 310 in the web application server 300 via the network 1100. The voice relay server 200 transmits the notification information from the document reading apparatus 400 transmitted by the client application 110 in the voice terminal 100 to the web application 310 in the web application server 300 via the network 1100. The voice relay server 200 also converts language data received from the web application 310 via the network 1100 into voice data using the dictionary data stored in the database 210 and transmits the voice data to the voice terminal 100.

The web application 310 included in the web application server 300 receives the language data from the voice conversation service application 220 in the voice relay server 200. The web application 310 executes processing corresponding to the content of the received language data and transmits language data for a response to a user to the voice conversation service application 220 via the network 1000 as necessary. The web application 310 also receives, from the voice conversation service application 220, the notification information from the document reading apparatus 400. Further, the web application 310 transmits language data for notification to a user corresponding to the received notification information to the voice conversation service application 220 via, the network 1000. In addition, the web application 310 performs character recognition processing on a scanned image received from the document reading apparatus 400 and stores extracted text information in a storage device 330.

A database 320 stores information necessary for the web application 310 to execute the above-described processing and dictionary data for performing character recognition processing.

The storage device 330 stores the text information which is a result of the character recognition processing performed by the web application 310.

The document reading apparatus 400 includes a scanning module 410 for transmitting a read scanned image to the web application 310.

The configuration of the network system according to the present exemplary embodiment is not limited to the above-described configuration. For example, the web application 310 may perform either one or both of the conversion process of the voice data and the conversion process of the language data performed by the voice relay server 200, and the same effect can be obtained if the voice terminal 100 performs either one or both of the conversion processes.

According to the present exemplary embodiment, the voice relay server 200 and the web application server 300 are each configured of a single server, but the present exemplary embodiment is not limited to this configuration. A plurality of servers may operate in conjunction with each other and establish a server system corresponding to the voice relay server 200 or the web application server 300. Further, for example, respective functions of the voice relay server 200 and the web application server 300 may be integrated into a single server.

Figure 2:
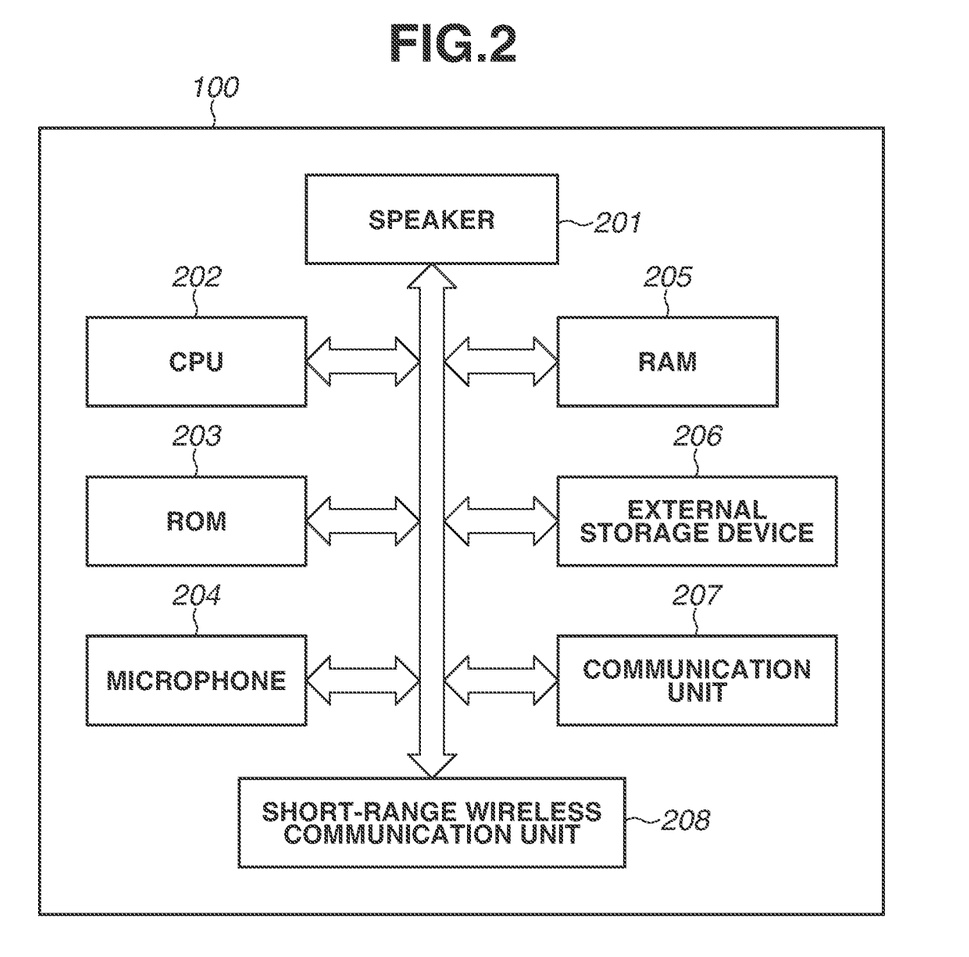
FIG. 2 illustrates a schematic configuration of a voice terminal.
Figure 3:
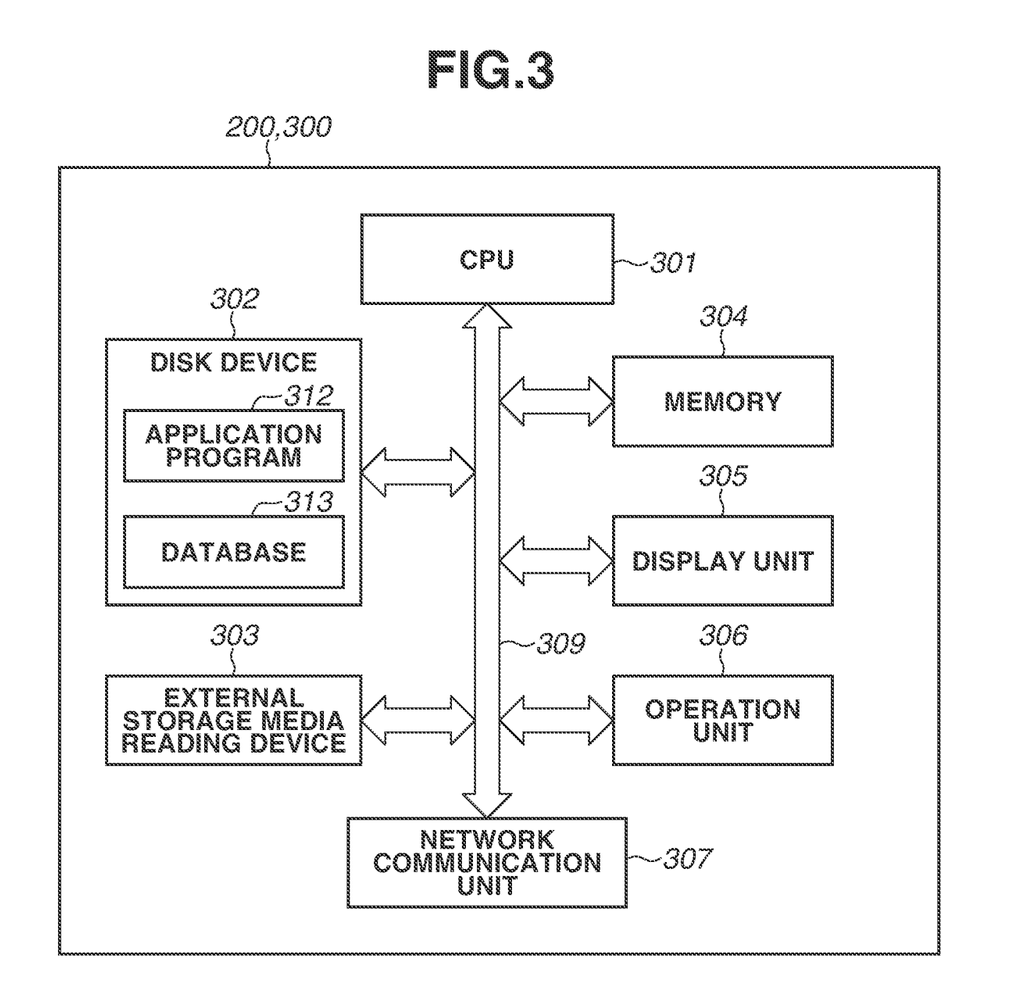
FIG. 3 illustrates a schematic configuration of a voice relay server and a web application server.
Figure 4:
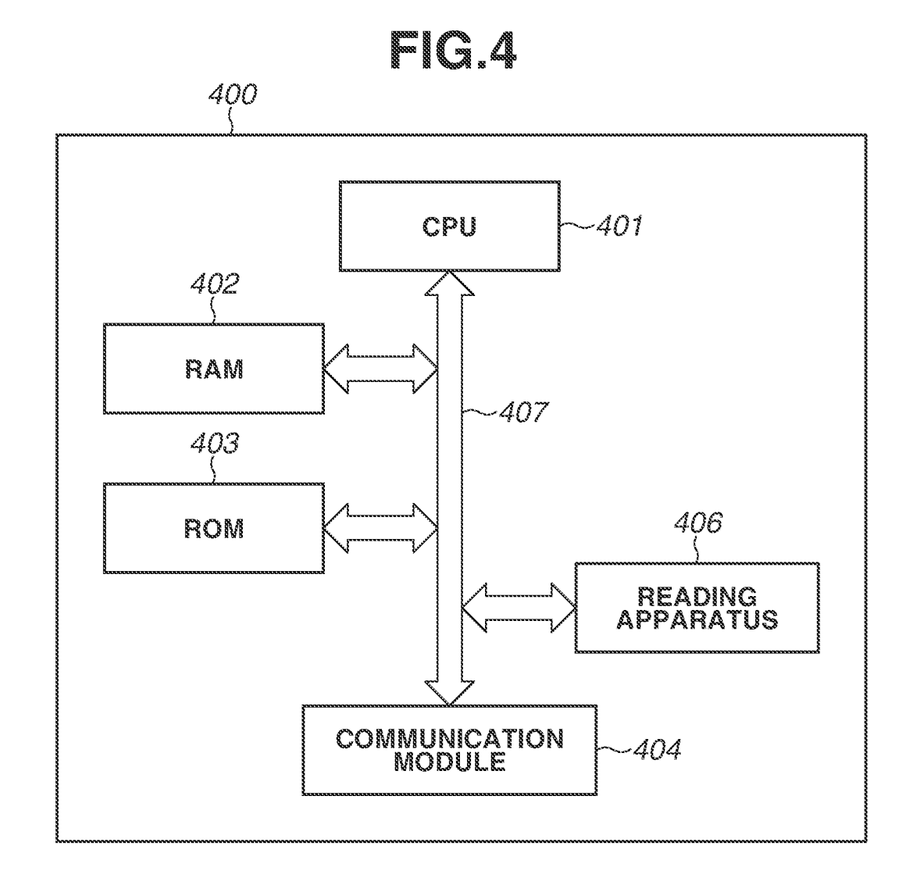
FIG. 4 illustrates a schematic configuration of a document reading apparatus.

FIG. 2 is a hardware configuration diagram of the voice terminal 100. The voice terminal 100 includes a speaker 201, a central processing unit (CPU) 202, a read-only memory (ROM) 203, a microphone 204, a random access memory (RAM) 205, an external storage device 206, a communication remit 207, and a short-range wireless communication unit 208. The microphone 204, the speaker 201, and the short-range wireless communication unit 208 respectively correspond to the microphone 130, the speaker 120, and the receiver 140. The CPU 202, the ROM 203, and the RAM 205 form a computer of the voice terminal 100. The components in each of the block diagrams illustrated in FIGS. 2 to 4 are connected with each other using, for example, an internal bus. The configurations described above are examples, and each apparatus may include hardware other than illustrated ones. The plurality of blocks in FIGS. 2 to 4 may be integrated into one block, and one block may be divided into two or more blocks. In other words, each apparatus can have an arbitrary configuration within a range in which processing as described below can be executed.

The microphone 204 receives a voice around the voice terminal 100. For example, the microphone 204 receives a voice uttered by a user. The speaker 201 outputs a voice by processing described below. The CPU 202 is a system control unit and entirely controls the voice terminal 100. The ROM 203 stores a control program executed by the CPU 202, a data table, and fixed data such as an embedded operating system (OS) program. According to the present exemplary embodiment, each control program stored in the ROM 203 is used to perform software execution control such as scheduling, task switching, and interrupt processing under control of the embedded OS stored in the ROM 203. The RAM 205 includes, for example, a static RAM (SRAM) which requires a backup power supply. Since data is maintained using a primary battery for data backup (not illustrated), RAM 205 can store the data such as a program control variable without volatilizing it. The RAM 205 also includes a memory area for storing setting information and management data of the voice terminal 100. The RAM 205 is also used as a main memory and a work memory of the CPU 202. The external storage device 206 stores application software.

The communication unit 207 is configured with a circuit and an antenna for performing communication according to a predetermined wireless communication method. For example, the communication unit 207 can wirelessly connect to an access point. The communication unit 207 may operate as an access point to be temporarily used. Wireless communication used in the present exemplary embodiment may have a capability to operate according to a wireless communication method of the wireless LAN conforming to the Institute of Electrical and Electronics Engineers (IEEE) 802.11 standard series or may have a capability to operate according to another wireless communication method.

The short-range wireless communication unit 208 executes short-range communication with another apparatus existing within a predetermined short distance range from the voice terminal 100. For example, the short-range wireless communication unit 208 can operate according to Bluetooth® standards or a wireless communication method of the wireless LAN conforming to IEEE 802.11 standard series different from that of the communication unit 207. Classic Bluetooth® and Bluetooth® Low Energy may be used as Bluetooth® standards.

FIG. 3 is a block diagram illustrating a schematic configuration of the voice relay server 200 and the web application server 300.

A CPU 301 is central processing unit for controlling each unit described below. A disk device 302 stores an application program 312 read out by the CPU 301, a database 313, an OS, and various files. In a case of the voice relay server 200, the disk device 302 stores, for example, a program of the voice conversation service application 220 as the application program 312. In a case of the web application server 300, the disk device 302 stores, for example, a program of the web application 310 as the application program 312. An external storage media reading device 303 reads out information about a file stored in an external storage medium such as a secure digital (SD) card. A memory 304 includes a RAM and is used by the CPU 301 to perform temporary storage and buffering of data as necessary. A display unit 305 includes, for example, a liquid crystal display (LCD) and displays various pieces of information. An operation unit 306 is used by a user to perform various input operations and includes, for example, a keyboard and a mouse. A network communication unit 307 is connected to a network such as the Internet and performs various types of communication. The network communication unit 307 may include, for example, an interface for communicating with an external apparatus via a wired LAN or the wireless LAN. Those units described above are connected to each other via a bus 309. Processing in the voice relay server 200 and the web application server 300 described below is realized by the CPU 301 reading out and executing a program necessary for the processing. The CPU 301, the memory 304, and others form a computer of the voice relay server 200 and the web application server 300.

FIG. 4 is a hardware configuration diagram of the document reading apparatus 400. The document reading apparatus 400 includes a CPU 401, a RAM 402, and a ROM 403. The CPU 401, the RAM 402, and the ROM 403 form a computer of the document reading apparatus 400. A system bus 407 is used for exchanging data among the CPU 401, the RAM 402, the ROM 403, and other units.

The CPU 401 performs calculation, determination, and control processes on data and a command according to a program stored in the RAM 402 or the ROM 403.

The RAM 402 is used as a temporary storage area by the CPU 401 for performing various types of processing.

The ROM 403 stores an OS and other application software. The ROM 403 can be a nonvolatile memory characterized by a flash memory capable of rewriting data.

The document reading apparatus 400 includes a communication module 404, and a reading apparatus 406.

The communication module 404 is, for example, an interface which is connected to a LAN cable and performs data communication with the web application server 300 via a router (not illustrated) or a network 1200. The data communication may be wirelessly performed, for example, by an interface adaptable to wireless communication.

The reading apparatus 406 is an apparatus such as an optical scanner apparatus for reading a document. The reading apparatus 406 may have, for example, a configuration which includes a document platen and reads a document set on the document platen or a configuration which includes an auto document feeder (ADF) and reads a plurality of document sheets at once.

Figure 8:
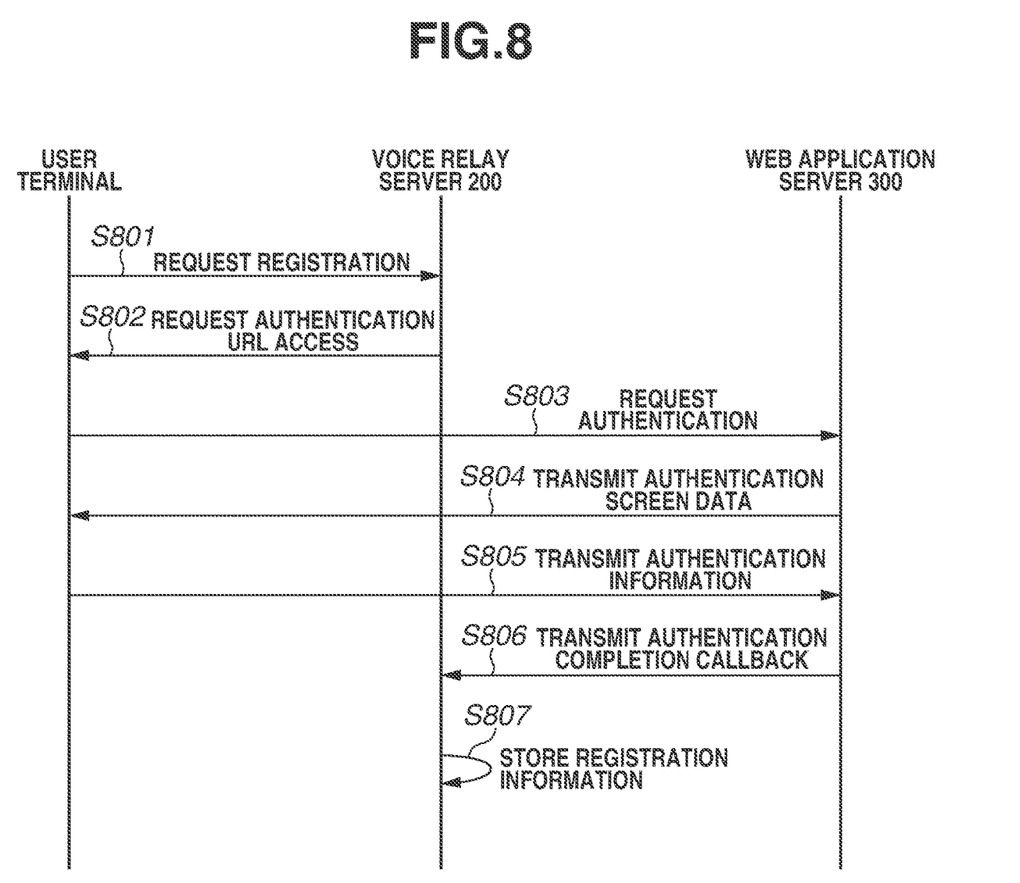
FIG. 8 is a sequence diagram illustrating processing for associating the voice terminal with the document reading apparatus.

Next, processing for associating the voice terminal 100 with the document reading apparatus 400 will be described. This association processing is performed, and accordingly a user can use a service (operations according to the present exemplary embodiment) provided by the configuration in FIG. 1. FIG. 8 is a sequence diagram illustrating the processing for associating the voice terminal 100 with the document reading apparatus 400. Each processing illustrated in sequence diagram of FIG. 8 is realized in such a manner that the CPU included in each apparatus loads a control program stored in the ROM included in each apparatus into the RAM included in each apparatus and executes the control program.

In step S801, a user transmits a registration request of a document reading aloud function to the voice relay server 200 using a mobile terminal such as a smartphone or a user terminal such as a personal computer which is associated with the voice terminal 100 in advance. The registration request may be executed, for example, on a local application installed in the user terminal or on a web page via a web browser.

In step S802, upon receipt of the registration request of the document reading aloud function, the voice relay server 200 requests the user terminal to access a uniform resource locator (URL) which is registered in advance for performing authentication to the web application server 300. In step S803, the user accesses the authentication URL using the user terminal which receives the request and transmits an authentication request to the web application server 300. In step S804, the web application server 300 which receives the authentication request transmits authentication screen data to the user terminal. The user terminal receives the authentication screen data and displays an authentication screen based on the authentication screen data. Subsequently, the user inputs authentication information which is registered in advance and is necessary for using the functions of the web application server 300 on the displayed authentication screen. As the necessary authentication information, for example, a user identification (ID) and a password which are registered by the user to log into the web application server 300 are used.

In step S805, the user inputs the authentication information necessary for using the functions of the web application server 300 to the user terminal, and then the user terminal transmits the input authentication information to the web application server 300. The web application server 300 executes authentication processing based on the authentication information transmitted from the user terminal. In step S806, in a case where the authentication processing is successfully completed, the web application server 300 transmits a callback indicating completion of the authentication to the voice relay server 200.

The voice relay server 200 obtains an access token for accessing the web application server 300 by the callback. The voice relay server 200 can access the web application server 300 using the obtained access token. The web application server 300 identifies the log-in user based on the access token and thus can identify the document reading apparatus 400 which is registered by the user.

In step S807, the voice relay server 200 stores information about the access token necessary for accessing the web application server 300 and a refresh token together with information about the voice terminal 100 associated with the user terminal. An expiration date may be set for the access token or the refresh token, or the expiration date may be infinite (or a finite period which can be regarded as infinite in actual use).

An authentication operation by a user has been described above as an example of a method for associating the voice terminal 100 with the document reading apparatus 400. However, another method can be used as long as the voice terminal 100 can be associated with the document reading apparatus 400.

After the voice terminal 100 is associated with the document reading apparatus 400, for example, a user can control the document reading apparatus 400 by giving a voice instruction to the voice terminal 100. Specifically, for example, a user can cause the document reading apparatus 400 to execute reading of a document and cause the voice terminal 100 to read aloud the content described in the read document by giving a voice instruction to the voice terminal 100. Control of the document reading apparatus 400 by a voice instruction is not limited only to execution of the document reading aloud function described above. For example, a user can also cause the document reading apparatus 400 to perform printing by giving a voice instruction to the voice terminal 100. Specifically, printing performed by the voice instruction includes, for example, printing of coloring paper, graph paper, music paper, and the like. More specifically, if a voice instruction to execute printing is received from a user, the voice terminal 100 transmits a print instruction to the document reading apparatus 400 and causes the document reading apparatus 400 to execute printing. At this time, the voice terminal 100 may perform control such that the print instruction is transmitted to the document reading apparatus 400 via the voice relay server 200 by transmitting voice information based on the voice instruction to the voice relay server 200. Further, for example, a user can receive a voice notification of information about a status of the document reading apparatus 400 by giving a voice instruction to the voice terminal 100.

Figure 5:
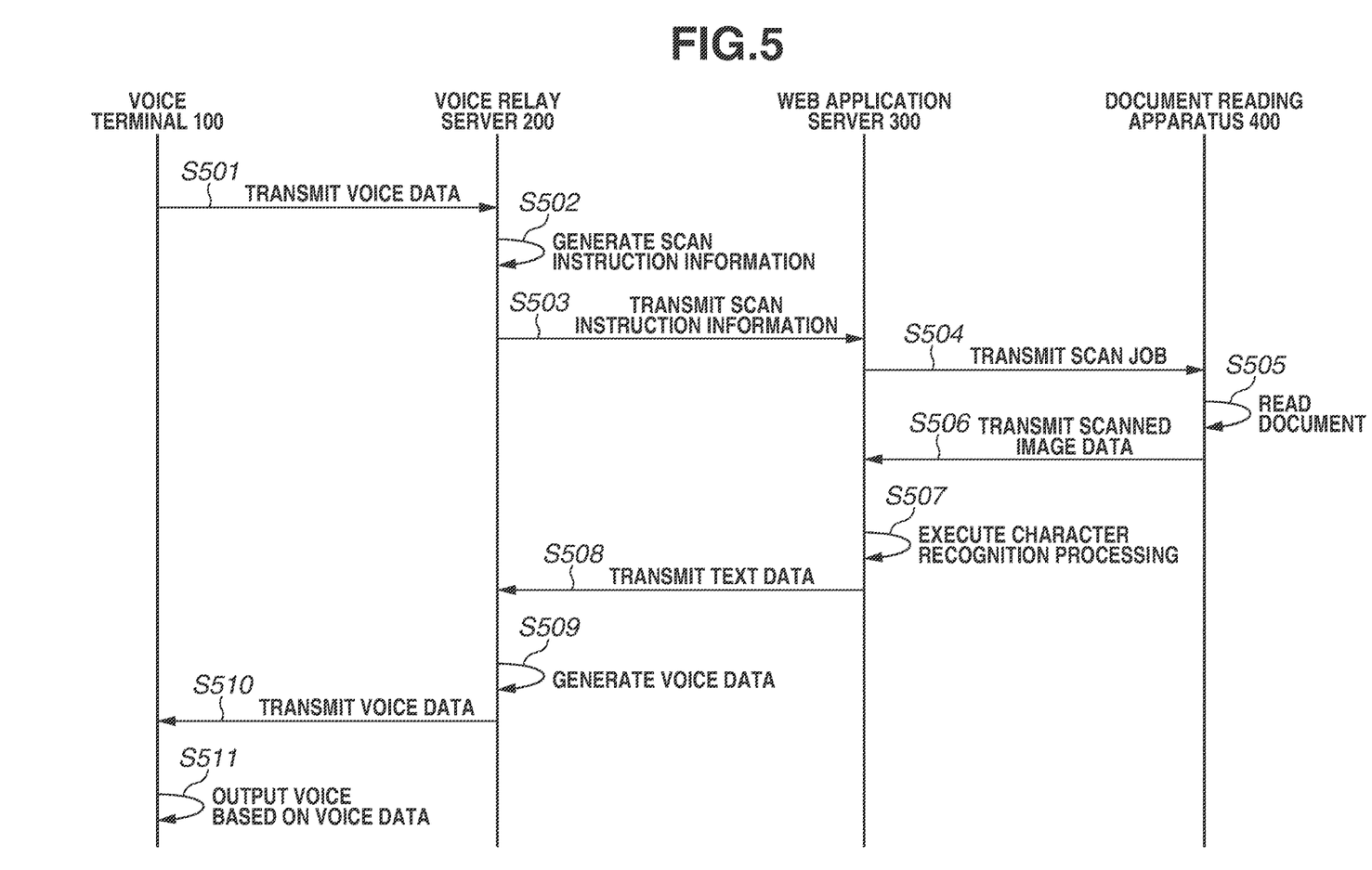
FIG. 5 is a sequence diagram illustrating processing by a document reading aloud function to be executed based on a voice instruction to the voice terminal.

FIG. 5 is a sequence diagram illustrating each processing in the document reading aloud function executed based on a voice instruction given to the voice terminal 100. Each processing illustrated in the present sequence diagram is realized in such a manner that the CPU included in each apparatus loads the control program stored in the ROM included in each apparatus into the RAM included in each apparatus and executes the control program.

In step S501, the voice terminal 100 receives an execution instruction of the document reading aloud function by voice from a user and transmits voice data indicating the received voice to the voice relay server 200.

In step S502, the voice relay server 200 generates scan instruction information based on the received voice data and the dictionary data.

In step S503, the voice relay server 200 transmits the scan instruction information generated in step S502 to the web application server 300.

In step S504, the web application server 300 transmits a scan job for executing reading processing to the document reading apparatus 400 which is associated with the voice terminal 100 by the association processing in FIG. 8 based on the received scan instruction information.

In step S505, the document reading apparatus 400 reads (scans) a document using the reading apparatus 406 based on a scan selling specified in the received scan job and generates scanned image data.

In step S506, the document reading apparatus 400 transmits the scanned image data generated in step S505 to the web application server 300.

In step S507, the web application server 300 performs character recognition processing on the received scanned image data, recognizes and extracts character information included in the scanned image data (character information described in the read document), and thus generates text data.

In step S508, the web application server 300 transmits the text data generated in step S507 to the voice relay server 200. For recognition and extraction of the character information, for example, optical character recognition (OCR) is used.

In step S509, the voice relay server 200 generates voice data for outputting the character information included in the scanned image data by voice based on the received text data.

In step S510, the voice relay server 200 transmits the voice data generated in step S509 to the voice terminal 100.

In step S511, the voice terminal 100 outputs the character information included in the scanned image data by voice based on the received voice data.

As described above, the present exemplary embodiment has the configuration in which the document reading aloud function is executed based on an instruction by voice, and thus a user can execute the document reading aloud function more easily. Further, as described above, the present exemplary embodiment has the configuration in which the voice terminal 100 outputs, by voice, a character written in a document read by the document reading apparatus 400, and thus the document reading aloud function can be provided even if the document reading apparatus 400 does not have a character recognition function and a speaker.

A second exemplary embodiment will be described. In the present exemplary embodiment, a configuration is described in which a web application server 300 stores text data based on the content of a document read by a document reading apparatus 400, so that a voice output based on the stored text data can be executed many times at arbitrary timings. Unless otherwise specified, a basic configuration of a voice control system according to the present exemplary embodiment is similar to that of the voice control system according to the first exemplary embodiment.

Figure 6:
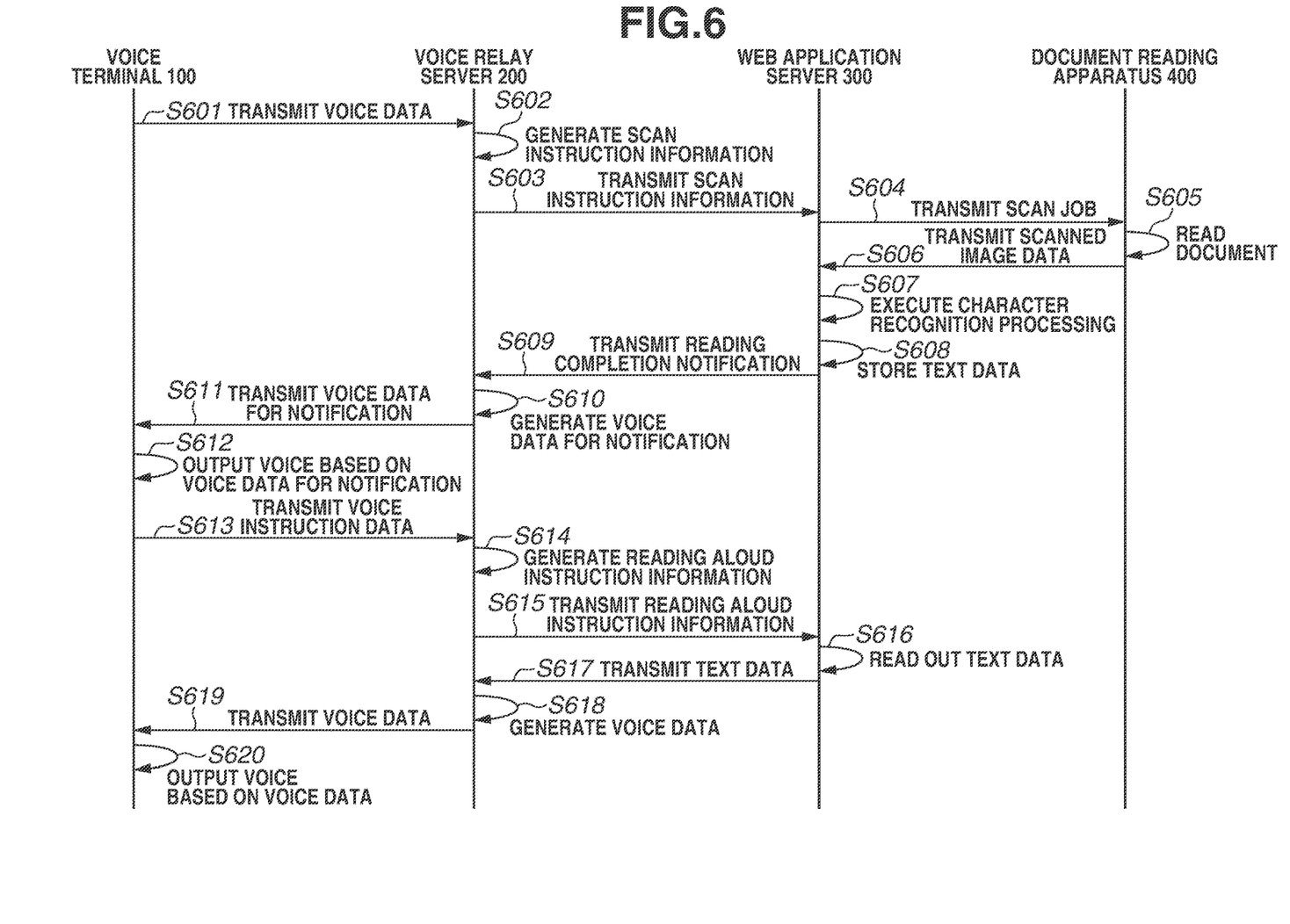
FIG. 6 is a sequence diagram illustrating processing by the document reading aloud function to be executed based on a voice instruction to the voice terminal.

FIG. 6 is a sequence diagram illustrating each processing in the document reading aloud function executed based on a voice instruction given to the voice terminal 100. Each processing illustrated in the present sequence diagram is realized in such a manner that the CPU included in each apparatus loads a control program stored in the ROM included in each apparatus into the RAM included in each apparatus and executes the control program.

Each processing in steps S601 to S607 is similar to that in steps S501 to S507.

Figure 7:
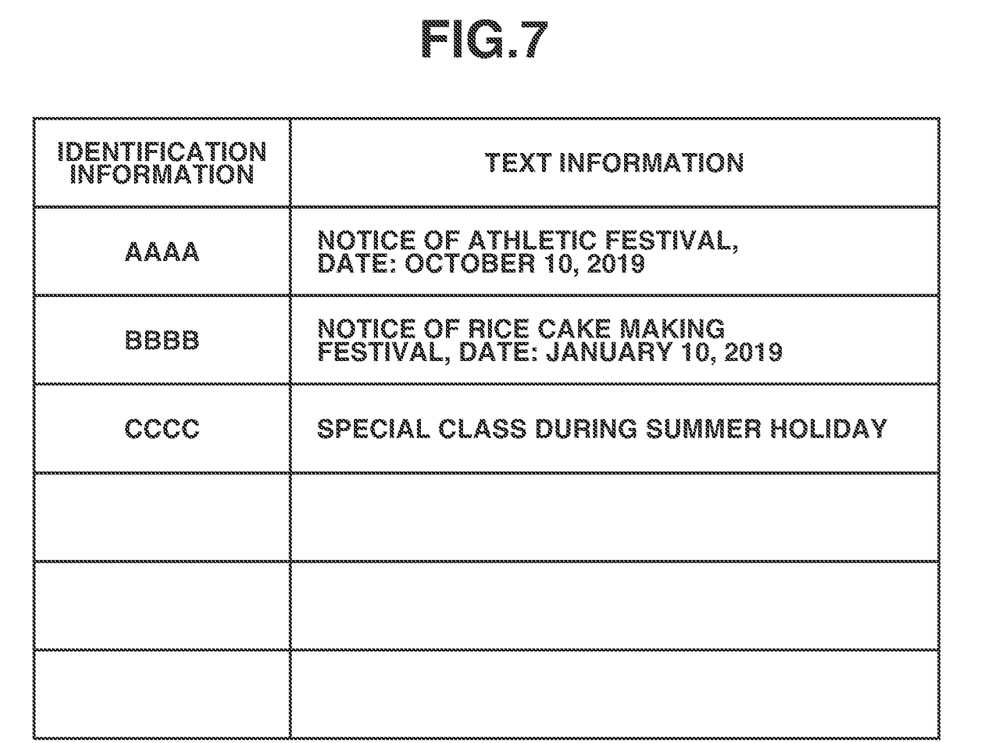
FIG. 7 is a table for managing text data and identification information.

In step S608, the web application server 300 stores the text data obtained as a result of the character recognition processing in step S607 in the storage device 330. At this time, the web application server 300 generates identification information for identifying the text data stored in step S608 and stores the identification information in the storage device 330 in association with the text data. FIG. 7 is a table for managing the text data and the identification information stored in the storage device 330.

In step S609, the web application server 300 transmits a reading completion notification for notifying of completion of scanning by the document reading apparatus 400 to the voice relay server 200.

In step S610, the voice relay server 200 generates voice data for notification for notifying the completion of scanning by the document reading apparatus 400 based on the reading completion notification. The voice data for notification may be data for notifying the identification information generated in step S608.

In step S611, the voice relay server 200 transmits the voice data for notification generated in step S610 to the voice terminal 100.

In step S612, the voice terminal 100 notifies the user of completion of scanning by the document reading apparatus 400 and the identification information generated in step S608 by voice based on the received voice data for notification. The voice relay server 200 may be configured to transmit, in step S611, the voice data for reading aloud the document together with the voice data for notification. Thus, in step S611, the voice relay server 200 may output the character information included in the scanned image data by voice.

In step S613, the voice terminal 100 receives an execution instruction of the document reading aloud function input from the user by voice and transmits voice data indicating the received voice to the voice relay server 200. The voice instruction input in step S613 by the user includes content different from that of the voice instruction input in step S601. For example, the voice instruction input in step S601 has content indicating "read the document", whereas the voice instruction input in step S613 has content indicating "read the document aloud". Further, the voice instruction input in step S613 includes the identification information notified in step S612. The above-described configuration enables a user to give an instruction of the text data to be a reading aloud target. In addition, the user may issue the voice instruction in step S613 at an arbitrary timing after the processing in step S612 is performed.

In step S614, the voice relay server 200 generates reading aloud instruction information based on the received voice data and the dictionary data. The reading aloud instruction information includes the identification information input in step S613.

In step S615, the voice relay server 200 transmits the reading aloud instruction information generated in step S614 to the web application server 300.

In step S616, the web application server 300 reads out the text data identified by the identification information input in step S613.

In step S617, the web application 310 transmits the text data read out in step S616 to the voice relay server 200.

Each processing in steps S618 to S620 is similar to that in steps S509 to S511.

The voice instruction by the user in step S613 may be executed again, and in that case, the processing in steps S613 to S620 is repeated again.

The above-described configuration enables a user to cause the voice terminal 100 to read aloud the content of the document once read, over and over at arbitrary timings.

In step S608, the identification information may be stored together with the text data. Specifically, the identification information is, for example, date and time information indicating a date and a time at which an execution instruction of reading processing which generates image data as an extraction source of text data to be stored is input by a user by voice to the voice terminal 100. For another example, the identification information is a date and time information indicating a date and a time at which the text data is stored. For a yet another example, the identification information is a date and time information indicating a date and a time at which the image data as the extraction source of the text data to be stored is generated (at which the reading processing is executed). In this case, the user inputs the date and time information by voice as the voice instruction in step S613 to specify the text data as a reading aloud target. Then, the web application server 300 reads out the text data identified by the input date and time information. In a case where there is no text data associated with the date and time information coincident with the input date and time information, the text data associated with date and time information closest to the input date and time information may be read out. For example, the web application server 300 may generate notification information for notifying the voice relay server 200 of a list of date and time information close to the input date and time information. The notification information is transmitted to the voice relay server 200, and thus the voice terminal 100 outputs a voice notification of the list of date and time information close to the input date and time information. The user specifies the text data as the reading aloud target by selecting arbitrary date and time information from the list. Subsequently, the web application server 300 reads out text data associated with the date and time information coincident with the selected date and time information. The above-described configuration enables a user to specify text data as a reading aloud target by date and time information.

Further, the execution instruction received from a user in step S601, for example, may include title information arbitrarily specified by the user as the identification information. Specifically, for example, the execution instruction may be issued using a phrase such as "read the document with * as a title". A portion "*" is the title information specified by the user. In this case, the identification information stored in step S608 is the title information specified by the user in the execution instruction.

Information to be associated with the text data does not necessarily have to be one. For example, the text data may be associated with both of the title information and the date and time information. In this case, a user may specify the text data as the reading aloud target in step S613 using the title information or the date and time information.

Further, the present exemplary embodiment may have a configuration in which not only a character written in a read document but also a text based on a picture, a drawing, and a graph included in the read document are read aloud. In this case, in step S607, image recognition processing for recognizing a picture, a drawing, and a graph is executed in addition to the character recognition processing. In a case where a picture, a drawing, or a graph is recognized by the image recognition processing, text data is generated for reading aloud a text corresponding to the recognized object. The text corresponding to the recognized object is, for example, a text indicating that the recognized object exists in the document such as "here is a graph". A timing at which the text corresponding to the recognized object is read aloud is controlled according to a position of the recognized object. For example, if there is a graph between characters "report" and "this year's sales are . . . ", a text corresponding to the graph is read aloud after the characters "report" are read aloud. Then, the characters "this year's sales . . . " are read aloud after the text corresponding to the graph is read aloud. A tone of voice to be used to read aloud a text corresponding to an object recognized by the image recognition processing and a tone of voice to be used to read aloud a text corresponding to a character recognized by the character recognition processing may be controlled to be different. Accordingly, a user who is listening to reading of the text can determine whether the text corresponding to the object is a text existing as a character in the document.

In a case where the reading apparatus 406 includes an automatic sheet feeder, the document reading apparatus 400 can generate a plurality of pieces of scanned image data by collectively reading a plurality of document sheets by a single document reading instruction. In this case, the web application server 300 may generate one piece of text data with respect to the plurality of pieces of scanned image data generated by the single document reading instruction or may generate text data for each scanned image data. In the latter case, for example, the web application server 300 associates common identification information common to all of the plurality of pieces of scanned image data generated by the single document reading instruction and individual identification information different for each scanned image data with the scanned image data. The individual identification information is, for example, a page number. In this case, a user may specify the common identification information and the individual identification information in specification of the text data as the reading aloud target. Specifically, for example, a user may issue the execution instruction using a phrase such as "read aloud from the second page of the document titled ***". In a case where a user specifies both of the common identification information and the individual identification information, in step S616, the web application server 300 reads out text data corresponding to each specified identification information. Accordingly, only the text data specified by the user is read aloud among a plurality of pieces of text data corresponding to a plurality of pieces of scanned image data generated by the single document reading instruction. In a case where a user issues the execution instruction by specifying only the common identification information, in step S616, the web application server 300 reads out all pieces of text data corresponding to the common identification information. Accordingly, all of the plurality of pieces of text data corresponding to the plurality of pieces of scanned image data generated by the single document reading instruction are read aloud.

The execution instruction using the individual identification information may be issued, for example, when the voice output is being executed based on the execution instruction using only the common identification information. In this case, the voice terminal 100 stops the voice output based on the execution instruction using only the common identification information and communicates with the voice relay server 200 based on the execution instruction using the individual identification information. Accordingly, the voice terminal 100 starts voice output based on the execution instruction using the individual identification information.

A skip instruction for skipping the text data being read aloud may be issued when the voice output is being executed based on the execution instruction using only the common identification information. Specifically, for example, a user may issue an execution instruction using a phrase such as "read aloud the next page" when the voice output is being executed. In this case, the voice terminal 100 stops the voice Output based on the execution instruction using only the common identification information and communicates with the voice relay server 200 based on the skip instruction. Accordingly, the voice terminal 100 starts reading aloud of text data corresponding to the next page of the text data being read aloud at the time when the skip instruction is issued.

Skipping can be performed not only on a page basis but also on a paragraph basis in a page by recognizing a paragraph of sentences from character arrangement information such as a line space between sentences in the page in the reading and character recognition processing on the document.

An identification instruction for identifying the text data being read aloud may be issued while the voice output is executed based on the execution instruction using only the common identification information. Specifically, for example, a user may issue the identification instruction using a phrase such as "take a note of this page" when the voice output is being executed. In this case, the voice terminal 100 transmits, to the voice relay server 200, the received identification instruction and the voice data indicating the text data being read aloud at the time when the identification instruction is issued. The voice relay server 200 transmits identification instruction information to the web application server 300 based on the received voice data and the dictionary data. The web application server 300 associates new identification information (herein below, note information) with the text data being read aloud at the time when the identification instruction is issued. Subsequently, in a case where the user issues the execution instruction to read aloud the text data associated with the note information, the text data associated with the note information is read out by the web application server 300 and read aloud by the voice terminal 100. Specifically, for example, the user issues the execution instruction using a phrase such as "read aloud the page taken a note of". In a case where a notification that association of the note information is completed is received from the voice relay server 200, the voice terminal 100 may notify the user by voice of a fact that association of the note information is completed and the identification information indicating the text data associated with the note information.

According the above-described exemplary embodiment, the text data is stored in the storage device 330. However, the image data which is used to generate the text data may be stored in the storage device 330 instead of the text data without being limited to the above-described configuration. Further, in a case where a user requests reading aloud the text data by a voice instruction, the text data may be extracted again from the image data corresponding to the identification information input by the user.

Other Exemplary Embodiments

The present disclosure can also be realized by supplying software (a program) for realizing the functions of the above-described exemplary embodiments to a system or an apparatus via a network or various storage media and causing a computer of the system or the apparatus to read and execute the program. In this case, the program and the storage media storing the program constitutes the present disclosure.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-215824, filed Nov. 28, 2019, which is hereby incorporated by reference herein in its entirety.

What is claimed is:

1. A communication system including a server system, a voice terminal and a document reading apparatus wherein:
the document reading apparatus comprises a reading unit configured to execute reading of a document to obtain image data of the document;
the voice terminal comprises a receiving unit configured to receive an instruction by user's voice; and
the server system comprises a processing unit configured to:
store text data associated with identification information, wherein the text data is obtained by executing recognition processing for the obtained image data of the document; and
cause the voice terminal to output, via a speaker of the voice terminal, the stored text data associated with the identification information in a case where the voice terminal receives the identification information by user's voice.

2. The communication system according to claim 1, wherein the document reading apparatus further comprising a transmission unit configured to transmit the obtained image data of the document to the server system, wherein the reading of the document is executed in a case where the voice terminal receives an instruction by the user's voice.

3. The communication system according to claim 1, wherein the server system further comprising a reception unit configured to receive the image data of the document which are transmitted from the document reading apparatus, wherein the recognition processing is executed for the image data of the document by the server system.

4. The communication system according to claim 1, wherein the identification information is date and time information, and
wherein the date and time information associated with the stored text data indicate a date and time when the voice terminal receives an instruction for causing the reading unit of the document reading apparatus to read the document, or a date and time when the image data of the document is obtained by the reading of the document, or a date and time when the text data is stored.

5. The communication system according to claim 4, wherein, in a case where the identification information received by the user's voice matches none of the stored date and time information associated with the stored text data, the server system causes the voice terminal to output, via the speaker of the voice terminal, any of stored text data associated with date and time information closest to the date and time indicated by the received identification information.

6. The communication system according to claim 1,
wherein the voice terminal receives the identification information together with the instruction by the user's voice, and
wherein, in a case where user inputs the voice terminal receives the identification information and the instruction by the user's voice after the reading is executed by the document reading apparatus, the server system causes the voice terminal to output, via the speaker of the voice terminal, the stored text data associated with the identification information.

7. The communication system according to claim 1, wherein, in a case where the document read by the document reading apparatus includes an object other than a character, notifying processing for causing the voice terminal to output, via the speaker of the voice terminal, a text for notifying that the document includes an object other than a character is executed by the server system.

8. The communication system according to claim 7, wherein, in a case where an object other than a character is placed after a predetermined character in the document read by the document reading apparatus, the notifying processing is executed by the server system after the voice terminal outputs the predetermined character via the speaker of the voice terminal.

9. The communication system according to claim 1,
wherein the document reading apparatus executes reading of a plurality of document sheets, and
wherein, in a case where a user specifies a page number to the voice terminal by user's voice, the server system causes the voice terminal to output, via the speaker of the voice terminal, text data corresponding to characters written on the page number specified by the user in the plurality of document sheets.

10. The communication system according to claim 1, wherein the server system stores second text data associated with second identification information in a case where a user issues a first instruction by user's voice to the voice terminal when the voice terminal is outputting the second text data via the speaker of the voice terminal, and wherein the server system causes the voice terminal to output, via the speaker of the voice terminal, the second text data associated with the second identification information in a case where the voice terminal receives the second identification information by user's voice.

11. The communication system according to claim 1, wherein the server system further comprising a job transmission unit configured to transmit a print job for executing predetermined print processing to the document reading apparatus based on issuance of a print instruction to the voice terminal by user's voice.

12. The communication system according to claim 1, wherein the server system further comprising an information reception unit configured to receive, via another server system different from the server system, the identification information received by the voice terminal,
wherein the server system causes the voice terminal to output, via the speaker of the voice terminal, the stored text data associated with the identification information in a case where the server system receives the identification information via another server system.

13. The communication system according to claim 12, wherein, in a case where the server system receives the identification information via another server system, the server system transmits the stored text data associated with the identification information to another server system that causes the voice terminal to output, via the speaker of the voice terminal, the stored text data associated with the identification information.

14. The communication system according to claim 1, wherein the server system includes one or a plurality of servers.

15. The communication system according to claim 1, wherein the voice terminal is a smart speaker.

16. A method for controlling a communication system which includes a server system, a voice terminal and a document reading apparatus, the method comprising:
executing reading of a document by the document reading apparatus for obtaining image data of the document;
receiving, by the voice terminal, an instruction by user's voice;
storing, by the server system, text data associated with identification information, wherein the text data is obtained by executing recognition processing for the obtained image data of the document; and
executing, by the server system, processing for causing the voice terminal to output, via a speaker of the voice terminal, the stored text data associated with the identification information in a case where the voice terminal receives the identification information by user's voice.

17. A server system comprising:
a reception unit configured to receive instruction information indicating that a user issues a predetermined instruction to a voice terminal by voice;
a storing unit configured to store text data associated with identification information, wherein the text data is obtained by executing recognition processing for image data obtained by a document reading apparatus when the voice terminal receives the predetermined instruction by user's voice; and
a processing unit configured to execute processing for causing the voice terminal to output, via a speaker of the voice terminal, the stored text data associated with the identification information in a case where the voice terminal receives the identification information by user's voice.

* * * * *